US008238367B1

(12) United States Patent
Choi et al.

(10) Patent No.: US 8,238,367 B1
(45) Date of Patent: Aug. 7, 2012

(54) SLOT ALLOCATION, USER GROUPING, AND FRAME PARTITION METHOD FOR H-FDD SYSTEMS

(75) Inventors: Jihwan P. Choi, San Jose, CA (US); Jungwon Lee, Cupertino, CA (US)

(73) Assignee: Marvell International Ltd., Hamilton (BM)

( * ) Notice: Subject to any disclaimer, the term of this patent is extended or adjusted under 35 U.S.C. 154(b) by 267 days.

(21) Appl. No.: 12/388,302

(22) Filed: Feb. 18, 2009

Related U.S. Application Data

(60) Provisional application No. 61/039,919, filed on Mar. 27, 2008.

(51) Int. Cl.
*H04J 3/16* (2006.01)

(52) U.S. Cl. ............................ 370/468; 370/235

(58) Field of Classification Search .............. 370/230, 370/230.1, 234, 235, 280, 281, 328–330, 370/336, 391, 468; 455/434, 450, 458, 561; 375/148
See application file for complete search history.

(56) References Cited

U.S. PATENT DOCUMENTS

| | | | | |
|---|---|---|---|---|
| 5,822,318 | A * | 10/1998 | Tiedemann et al. | 370/391 |
| 7,215,653 | B2 * | 5/2007 | Kim et al. | 370/329 |
| 7,218,644 | B1 * | 5/2007 | Heinonen et al. | 370/468 |
| 7,392,054 | B2 | 6/2008 | Cho et al. | |
| 7,423,997 | B2 * | 9/2008 | Kuchibhotla et al. | 370/336 |
| 7,801,490 | B1 * | 9/2010 | Scherzer | 455/67.13 |
| 2004/0097238 | A1 | 5/2004 | Hwang et al. | |
| 2005/0053123 | A1 * | 3/2005 | Higuchi et al. | 375/148 |
| 2005/0053164 | A1 | 3/2005 | Catreux et al. | |
| 2005/0111488 | A1 * | 5/2005 | Subramanian et al. | 370/468 |
| 2006/0203765 | A1 * | 9/2006 | Laroia et al. | 370/328 |
| 2007/0248048 | A1 | 10/2007 | Zhu et al. | |
| 2008/0075032 | A1 | 3/2008 | Balachandran et al. | |
| 2008/0123569 | A1 * | 5/2008 | Doss et al. | 370/280 |
| 2008/0159417 | A1 | 7/2008 | Yin et al. | |
| 2008/0232341 | A1 | 9/2008 | Andrews et al. | |
| 2008/0299981 | A1 * | 12/2008 | Foschini | 455/446 |

(Continued)

FOREIGN PATENT DOCUMENTS

EP     1 718002 A1 * 2/2006

OTHER PUBLICATIONS

IEEE Std 802.16-2004 (Revision of IEEE Std 802.16/2001), "IEEE Standard for Local and metropolitan area networks; Part 16: Air Interface for Fixed Broadband Wireless Access Systems," *The Institute of Electrical and Electronics Engineers, Inc.*, Oct. 1, 2004; 893 pages.

(Continued)

*Primary Examiner* — Andrew Lai

(57) ABSTRACT

Communication between a base station and remote stations is partitioned into frames, each including subframes having a number of slots that are allocated based on data rates for each remote station. For communication in a half-duplex mode, multiple subframes are used, each separated by a frame partition, such that a first user group of remote stations can receive down-link data in a first subframe while another user group of remote stations can transmit up-link data during that same subframe. For the next subframe, the converse happens. Slot allocation is achieved in such a half-duplex system based on weighted down-link and up-link data rates and without first or simultaneously determining user group allocation or frame partition, which are instead determined in response to the determined slot allocations for each remote station, e.g., using a linear programming technique.

24 Claims, 7 Drawing Sheets

U.S. PATENT DOCUMENTS

2009/0046606 A1* 2/2009 Wan et al. .................. 370/280
2009/0092067 A1* 4/2009 Sudarshan et al. ........... 370/281

OTHER PUBLICATIONS

IEEE Std 802.16a-2003 (Amendment to IEEE Std 802.16-2001) "IEEE Standard for Local and metropolitan area networks: Part 16: Air Interface for Fixed Broadband Wireless Access Systems-Amendment 2: Medium Access Control Modifications and Additional Physical Layer Specifications for 2-11 GHZ," *The Institute of Electrical and Electronics Engineers, Inc.*, Apr. 1, 2003.

IEEE Std 802.16e-2005 and IEEE Std 802.16-2004/Cor1-2005 (Amendment and Corrigendum to IEEE Std 802.16-2004), IEEE Standard for Local and metropolitan area networks: Part 16: Air Interface for Fixed and Mobile Broadband Wireless Access Systems: Amendment 2: Physical and Medium Access Control Layers for Combined Fixed and Mobile Operation in Licensed Bands and Corrigendum 1, *The Institute of Electrical and Electronics Engineers, Inc.*, Feb. 28, 2006.

IEEE P802.16Rev2/D5 (Jun. 2008) (Revision of IEEE Std 802.16-2004 and consolidates material from IEEE Std 802.16e-2005, IEEE Std 802.16-2004/Cor1-2005, IEEE Std 802.16f-2005 and IEEE Std 802.16g-2007) "Draft Standard for Local and metropolitan area networks: Part 16: Air Interface for Broadband Wireless Access Systems," *The Institute of Electrical and Electronics Engineers, Inc.*, Jun. 2008.

Wong, C.Y. "Multiuser OFMD with Adaptive Subcarrier, Bit, and Power Allocation," IEEE Journal on Selected Areas in Communications, vol. 17, No. 10 pp. 1747-1758 (Oct. 1999).

"Mobile WiMAX-Part 1: A Technical Overview and Performance Evaluation," WiMax Form, Aug. 2006.

U.S. Appl. No. 12/118,525, filed May 9, 2008, entitled "Slot Allocation Method and Apparatus for Slot-Based Communication" (unpublished).

Non-Final Office Action for U.S. Appl. No. 12/118,525, dated Apr. 4, 2011.

* cited by examiner

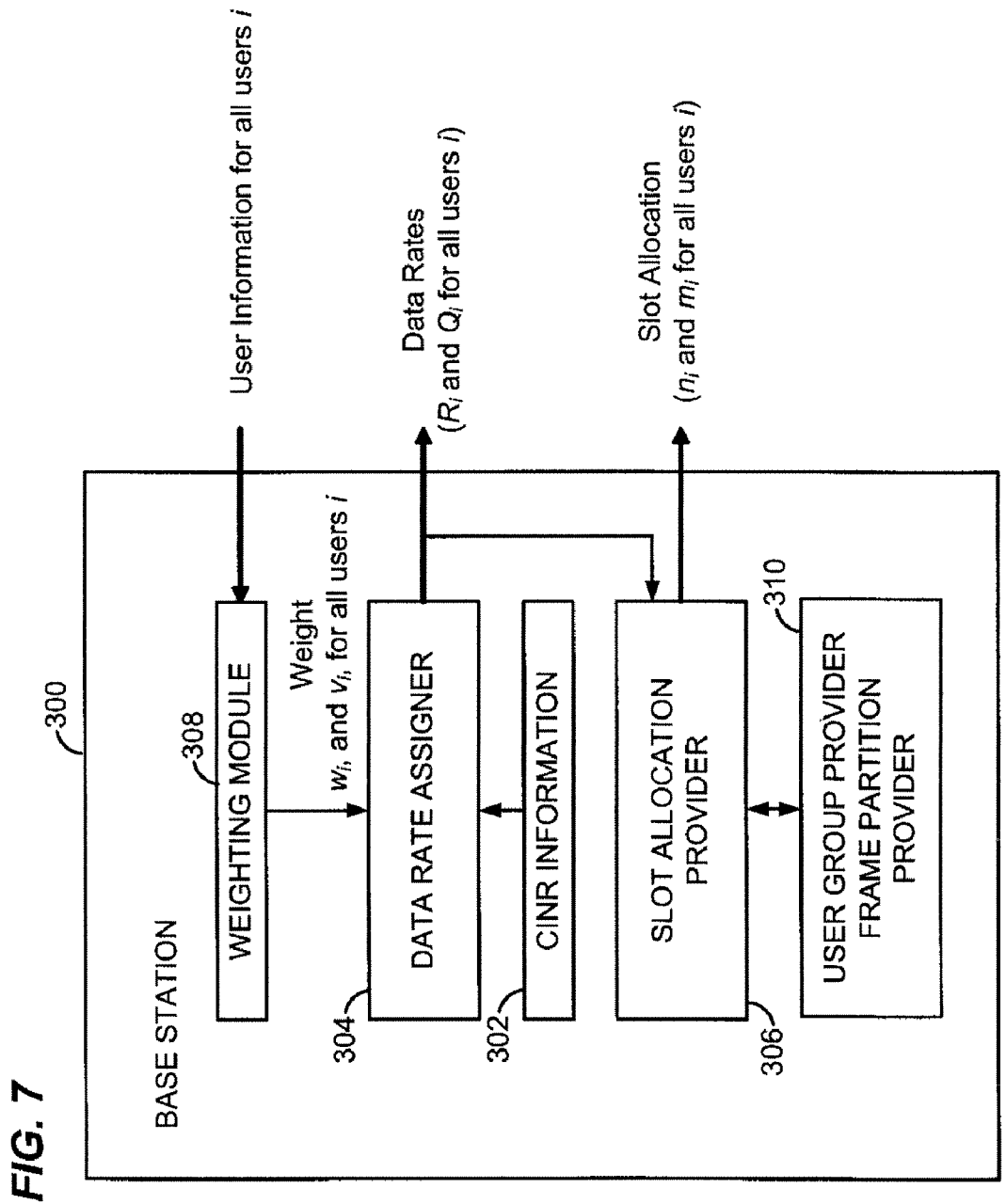

SLOT ALLOCATION, USER GROUPING, AND FRAME PARTITION METHOD FOR H-FDD SYSTEMS

CROSS-REFERENCE TO RELATED APPLICATION

The present application claims the benefit of U.S. Provisional Application No. 61/039,919, entitled "Joint Slot Allocation, User Grouping and Frame Partitioning for OFDMA H-FDD," filed on Mar. 27, 2008, which is hereby incorporated by reference herein in its entirety.

FIELD OF TECHNOLOGY

The present disclosure relates generally to slot-based communication schemes and devices that use them, and more particularly, to techniques for assigning users to one of a number of groups in a half-duplex, slot-based communication scheme, allocating slots in each grouping, and partitioning a frame ratio for the groupings.

DESCRIPTION OF THE RELATED ART

Slot-based communication systems, such as WiMAX systems and other systems employing the IEEE 802.16 family of communication standards, typically include one or more base stations and two or more remote stations that communicate with the one or more base stations by transmitting data in a plurality of time and frequency slots. These systems use different communication schemes for up-linking data (i.e., sending from the remote stations to the base stations) and for down-linking data (i.e., sending from the base stations to the remote stations). Time division duplexing (TDD) schemes, for example, assign the same frequency slot for both up-linking And down-linking, but assign different remote stations to transmit at different time slots. Full-frequency division duplexing (F-FDD) schemes assign different frequency slots for up-linking and down-linking data and allow remote stations to communicate on both links simultaneously, i.e., on a common time slot. A hybrid-type scheme now being explored is half-frequency division duplexing (H-FDD) in which different frequency slots are assigned for down-linking and up-linking, like F-FDD, but where time slots are not shared, meaning that a remote station can only communicate on one of these two links at a given time. While some communication standards such as WiMAX Revision 1.0 only require the more traditional TDD, the desire for F-FDD/H-FDD compliant systems is increasing as a way of promoting performance flexibility and better meeting the regulatory demands of various countries where networks may be installed.

The three schemes offer different advantages and disadvantages. The TDD scheme is generally considered more flexible because the ratio of the down-link time and the up-link time can be adjusted with greater ease; however that ease comes at the expense of increased time delay. F-FDD schemes require more complex schemes to process down-linking and up-linking data simultaneously, but processing delay is reduced over that of TDD.

For H-FDD schemes there are unique design challenges separate from the other two. Unlike TDD and F-FDD schemes, H-FDD schemes assign remote stations to different groups, one for the down-link and another for up-link at any given time, such that a remote station is only assigned to one group at a time. The time and frequency slots are divided into a series of frames, where each frame is divided into the number of identified groups. The boundary between the groups is the frame partition. Resource allocation and scheduling is achieved through assigning remote stations to one of the various slots with a group. Each slot can be considered the minimum unit for data allocation and may comprise one or more subcarriers and one or more symbols per subcarrier, where the symbols may be modulated on subcarriers using orthogonal frequency-division multiplexing (OFDM), as in WiMAX systems, or using any other desired modulation scheme consistent with slot-based communication.

An H-FDD compliant base station, therefore should efficiently assign users to various groups, set frame partitions (or relative sizes) between groups, and allocate slots among the remote stations communicating with that base station at any given time, to maximize system capacity and minimize power consumption.

SUMMARY OF THE DISCLOSURE

Embodiments described herein may be adapted for use in WiMAX systems and other slot-based communication system having at least one base station and a plurality of remote stations, wherein time and frequency resource available for communication among the at least one base station and the plurality of remote stations is partitioned into a series of frames, each frame including at least two user groups (down-link and up-link) and a total number of slots per group, where the slots may be allocated in a way that seeks to maximize system capacity, attain acceptable QoS for system users, provide fairness to users, etc.

In one embodiment, a method is provided for establishing duplex communication between at least one base station and a plurality of remote stations, wherein the duplex communication is partitioned into a series of frames, each frame including a total integer number of slots, N, for down-link communication and a total integer number of slots, M, for an up-link communication. The method comprises: assigning to each remote station a respective down-link data rate and a respective up-link data rate for communication between that remote station and the at least one base station; providing for each remote station a respective down-link slot allocation for communication between that remote station and the at least one base station and comprising a number of slots of the total slots N; and providing for each remote station a respective up-link slot allocation for communication between that remote station and the at least one base station and comprising a number of slots of the total slots M, wherein each remote station has a respective weighted down-link data rate dependent on the respective down-link data rate assigned to that remote station and each remote station has a respective weighted up-link data rate dependent on the respective up-link data rate assigned to that remote station, whereby a minimum of the respective weighted down-link data rate varies with the respective down-link slot allocation for each remote station and a minimum of the respective weighted up-link data rate varies with the respective up-link slot allocation for each remote station, and wherein the respective down-link slot allocations of the plurality of remote stations and the respective up-link slot allocations of the plurality of remote stations are determined so as to maximize the minimum of the weighted down-link data rates and of the weighted up-link data rates of the plurality of remote stations.

In some such examples, the duplex communication is half-duplex communication and each frame comprises a first sub-frame in which a first user group of remote stations receives down-link data and a second user group of remote stations communicates up-link data and a second subframe in which the first user group of remote stations transmit up-link data and the second user group of remote stations receives down-link data, wherein each of the remote stations is assigned to either the first user group or the second user group each frame, wherein the first subframe is separated from the second subframe by a frame partition.

In an example determination of the slot allocation, the weighted down-link data rate of each remote station i is given by $$\frac{n_i R_i}{w_i},$$

where $n_i$ is the number of slots assigned to the remote station i for down-link communications in each frame, $R_i$ is the down-link data rate per slot assigned to the remote station i for down-link communications in each frame, and $w_i$ is a down-link weighting factor assigned to the remote station i. The weighted up-link data rate of each remote station i is given by $$\frac{m_i Q_i}{v_i},$$

where $m_i$ is the number of slots assigned to the remote station i for up-link communications in each frame, $Q_i$ is the up-link data rate per slot assigned to the remote station i for up-link communications in each frame, and $v_i$ is a up-link weighting factor assigned to the remote station i.

In some examples, the method, after providing the respective down-link slot allocation and the respective up-link slot allocation for each remote station, assigns each remote station to one of the first user group or the second user group. The method further includes determining a down-link frame partition for separating the first subframe and the second subframe for down-link communications, where the down-link frame partition depends on the respective down-link slot allocations and the respective up-link slot allocations to each remote station and depends on the assignment of each remote station to either the first user group or the second user group; determining an up-link frame partition for separating the first subframe and the second subframe for up-link communications, where the up-link frame partition depends on the respective down-link slot allocations and the respective up-link slot allocations to each remote station and depends on the assignment of each remote station to either the first user group or the second user group; and determining the frame partition from the down-link frame partition and the up-link frame partition.

In another embodiment, a method for establishing duplex communication in a slot-based communication system, wherein communication is among at least one base station and a plurality of remote stations over a series of frames, each frame including a total integer number of slots, N, for down-link communications and a total integer number of slots, M, for up-link communications, comprises: (A) assigning to each of the plurality of remote stations a respective down-link slot allocation for receiving down-link data from the at least one base station during the frame and a respective up-link slot allocation for transmitting up-link data to the at least one base station during the frame; (B) assigning each of the plurality of remote stations to one of a first user group and a second user group, wherein remote stations in the first user group are to receive down-link data in a first subframe and are to communicate up-link data in a second subframe, and wherein remote stations in the second user group are to communicate up-link data in the first subframe and are to receive down-link data in the second subframe; and (C) determining a frame partition separating the first subframe from the second subframe based on the assigned respective down-link slot allocation and the assigned respective up-link slot allocation for each of the remote stations. The method may dynamically adjust each frame, for example by performing at least one of (A), (B) or (C) each frame.

In some of the above embodiments, the duplex communication system is a WiMAX system; and in some more specific examples, the WiMAX system communicates in a half-frequency division duplex mode.

In another embodiment, an apparatus for establishing duplex communication between at least one base station and a plurality of remote stations, wherein the duplex communication is partitioned into a series of frames, each frame including a total integer number of slots, N, for down-link communication and a total integer number of slots, M, for up-link communication, comprises: a data rate assigner configured to assign a respective down-link data rate and a respective up-link data rate to each remote station of the plurality of remote stations; and a slot allocation provider configured to provide for each remote station a respective down-link slot allocation for receiving down-link data from the at least one base station and comprising a number of slots of the total slots N, and to provide for each remote station a respective up-link slot allocation for communicating up-link data to the base station and comprising a number of slots of the total slots M, wherein each remote station has a respective weighted down-link data rate dependent on the respective down-link data rate assigned to that remote station and each remote station has a respective weighted up-link data rate dependent on the respective up-link data rate assigned to that remote station, whereby a minimum of the respective weighted down-link data rate varies with the respective down-link slot allocation for each remote station and a minimum of the respective weighted up-link data rate varies with the respective up-link slot allocation for each remote station, and wherein the respective down-link slot allocations of the plurality of remote stations and the respective up-link slot allocations of the plurality of remote stations are determined so as to maximize the minimum of the weighted down-link data rates and of the weighted up-link data rates of the plurality of remote stations; a user group provider configured to assign each of the remote stations to one of a first user group and a second user group, wherein remote stations in the first user group are to receive down-link data in a first subframe of the frame and are to communicate up-link data in a second subframe of the frame, and wherein remote stations in the second user group are to communicate up-link data in the first subframe and are to receive down-link data in the second subframe; and a frame partition provider configured to determine a frame partition separating the first subframe from the second subframe based on the assigned respective down-link slot allocation and the assigned respective up-link slot allocation for each of the remote stations.

BRIEF DESCRIPTION OF THE DRAWINGS

FIG. 7 depicts an example base station that may implement slot-allocation, user grouping, and frame partitioning techniques such as described herein.

DETAILED DESCRIPTION

Figure 1:
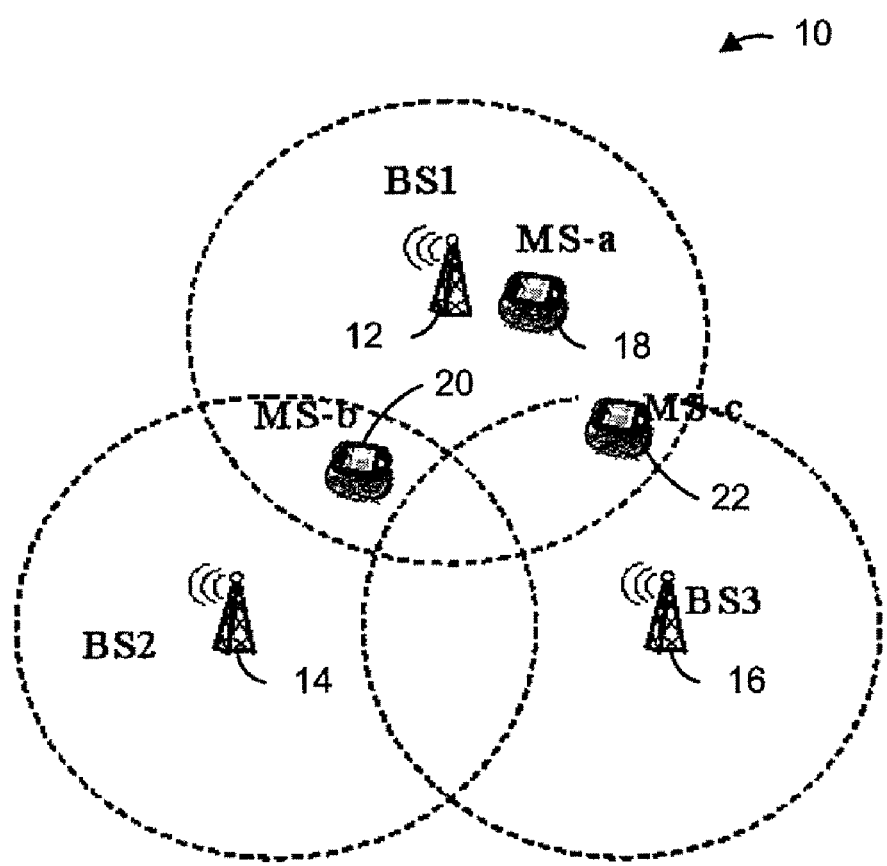
FIG. 1 depicts a cellular communication system for duplex communication between remote stations at least one base station.

FIG. 1 depicts an example communication system 10 in connection with which slot-allocation methods and apparatus described herein may be used. More particularly, the slot-allocation techniques may be used in cellular and other communication systems and may employ the IEEE 802.16 family of communication standards or any other slot-based communication techniques to provide for communication among one or more base stations and a plurality of remote stations, which may be either fixed (i.e., stationary) or mobile stations. The example communication system 10 illustrated in FIG. 1 includes three base stations 12, 14, 16 and three remote stations 18, 20, 22.

In slot-based communication systems, such as systems employing WiMAX (WiMAX systems) as well as, more generally, cellular and other communication systems for providing voice, data, audio, and video communication, efficient operation requires careful allocation of available time and frequency resources among all remote stations using the system to achieve performance objectives such as maximum usage, quality of service requirements, and fairness to users, for example. For explanatory purposes, an example WiMAX system as shown in FIG. 1 is described herein, but those of ordinary skill in the art will appreciate that slot-allocation techniques described herein also may be used in any other slot-based communication system. Further, the slot-allocation techniques may be practiced in connection with communication systems employing modulation schemes other than the orthogonal frequency-division multiplexing (OFDM) typically employed by WiMAX systems.

The illustrated WiMAX system 10 is described as an H-FDD OFDMA system, in which joint slot allocation, user grouping, and frame partitioning techniques are described. The techniques have been developed based on decision factors of interest including traffic demand and throughput, channel conditions in terms of CINR (carrier-to-interference-plus-noise ratio), and QoS (quality of service) concerns such as latency. More specifically, example heuristic algorithms derived from an optimization problem have been proposed, and which may be implemented from either the remote station side or the base station side, although the later is primarily described herein.

The illustrated WiMAX system 10 has a predetermined amount of available time and frequency resource which is divided into frames. As discussed further below, each frame preferably has a first subframe and a second subframe, each of which is divided into minimum data allocation units called slots. A slot corresponds to a predetermined range of subcarriers (e.g., 14, 24, or 48 subcarriers, etc.) at a given time and for a predetermined duration (e.g., 0.3 ms). The remote stations are assigned to different user groups, such that duplex communication can be achieved in each subframe. In an H-FDD scheme WiMAX system, remote stations assigned to Group 1 may simultaneously receive down-link data, while the remote stations assigned to Group 2 are simultaneously communicating up-link data. These simultaneous communications are achieved by assigning to each remote station a different slot or slots (and thus different subcarrier and symbol) within a subframe. The base stations 12, 14, 16 preferably allocate available slots to remote stations judiciously, as described herein in detail.

The system 10 may assign and re-assign remote stations to one of either Group 1 or Group 2 each frame. Or such user grouping may occur on a less frequent basis. By assigning remote stations to slots in only one of the identified groups per frame, each remote station can process either up-link or down-link data only at one time while the system is still able to maintain half-duplex communication. For example, the base station 12 assigns, re-assigns, slots in the Group 1 and Group 2 to remote stations or users communicating with the base station 12 and attempts, in doing so, to maximize system capacity, provide fairness to users, meet users' individual requirements for quality of service, etc. The system recognizes that these performance goals may conflict at times and require tradeoffs in allocating slots among remote stations. Therefore, the slot-allocation techniques described below provide a way for base stations of a slot-based communication system to efficiently allocate slots among remote stations.

In WiMAX and other cellular systems, each remote station periodically provides to the base station with which it is communicating at any given time information regarding the CINR for the remote station within each group. This enables the base station to calculate the data rate per slot for each remote station and each group.

Figure 2:
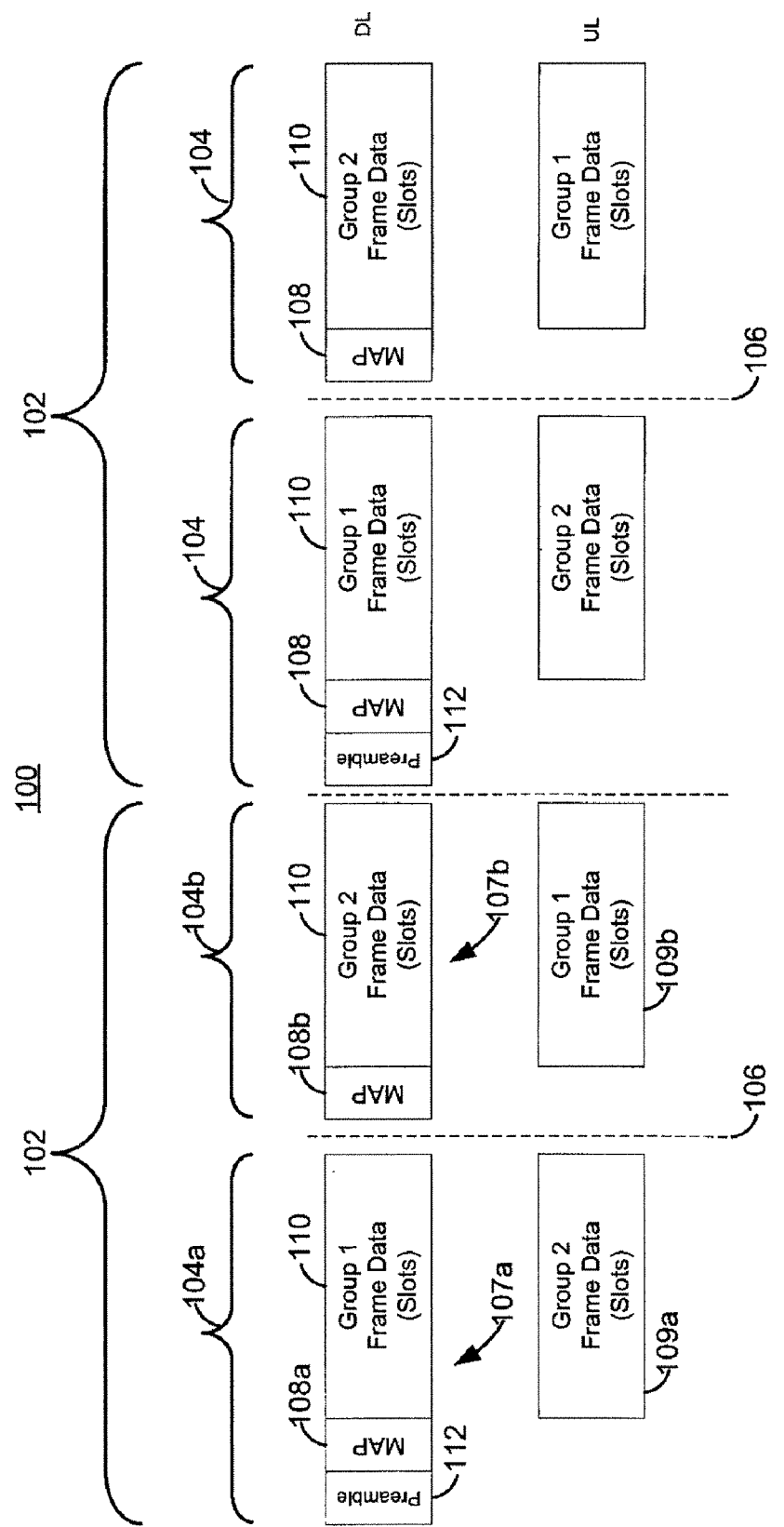
FIG. 2 depicts an example frame for a duplex communication in a slot-based communication system having user groups.

FIG. 2 depicts the H-FDD frame structure 100 for down-link and up-link communications using a two specific standalone Mobile Application Part (MAP) messages and a single preamble. The frame may be 5 ms in length, for example. A base station (such as base stations 12, 14, and 16) sequentially broadcasts H-FDD frames 102 that are each divided into subframes 104 separated from one another by a frame partition 106. The subframes 104 contain a down-link portion 107 and an up-link portion 109. Each down-link portion 107 in the H-FDD frame 102 contains a MAP message 108 that is broadcast to all remote stations to map the down-link intervals for those stations and to allocate up-link intervals for subsequent frames. The MAP messages 108 also identify the structure of frame data 110 that follows. To achieve half duplex operation, each the down-link portions 107 and the up-link portions 109 of each subframe 104 are assigned to a different broadcast group. The first portion 107a is assigned to Group 1 and broadcasts MAP message 108a for the remote stations in Group 1; while subframe portion 107b is assigned to Group 2 and broadcasts MAP message 108b for the remote stations in Group 2. A common preamble 112 is used to indicate to remote stations the beginning of each new H-FDD frame 102.

Each subframe 104 also includes an up-link subframe portion 109, one of which 109a is assigned to Group 2 in the first subframe 104a, the other of which 109b is assigned to Group 1 in the second subframe 104b. These subframes 104a and 104b are separated by the frame partition 106. The first subframe portion 109a contains up-link data received from the Group 2 remote stations. This up-link data is received simultaneously to the transmission of down-link data being sent to the Group 1 remote stations by the subframe portion 107a.

The subframe 104b has two portions 107b and 109b assigned to different user groups as a result for achieving the converse result to that of subframe 104a. While two identical frames 102 are shown, as discussed further below, each frame may have a different frame portion and Group load balancing.

Figure 3:
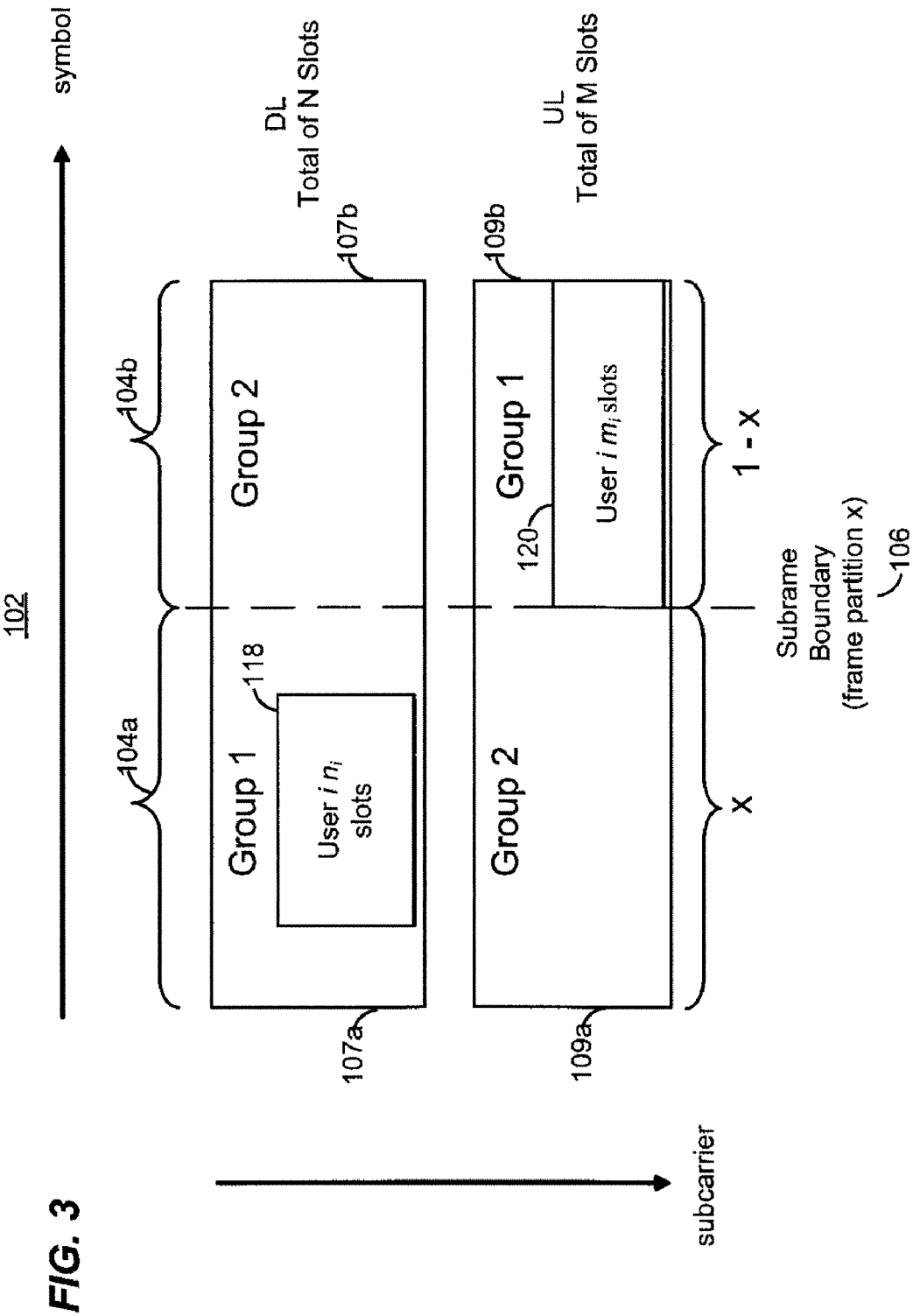
FIG. 3 depicts another illustration of the example frame of FIG. 2 illustrating the respective down-link slot allocation, $n_i$, and the respective up-link slot allocation, for remote station i in one of the allocated user groups, Group 1.

FIG. 3 graphically depicts a portion of the H-FDD frame 102 (simplified without the preamble and MAP messages) for communication in an example WiMAX system. As shown, the horizontal axis represents time (or symbols), and the vertical axis represents frequency (or subcarrier). The subframe portion 107a uses subcarrier frequencies assigned to down-link data in the H-FDD system by one of the base stations 12, 14, or 16, while the subframe portion 109a uses subcarrier frequencies assigned to up-link data.

An OFDMA modulation scheme mixes different symbols with the different subcarriers to define slots of a determined size, where each subframe is divided into a number of slots, which are then assigned to remote stations by the base station. A slot can be as small as one symbol by one subcarrier, or can be any desired larger size, from multiplying a number of symbols by a number of subcarriers. The total number of slots in the down-link subframe portions 107 of the H-FDD frame 102 is N. The total number of slots in the up-link subframe portions 109 of the H-FDD frame 102 is M.

In the illustrated example, portion 118 of subframe 104a and portion 120 of subframe 104b represent time and frequency resources allocated to a user i (i.e., the remote station belonging to user i) in Group 1, and for the particular subframe frame shown. For convenience, the numbers of slots allocated to user i in the subframe portion 107 and allocated to the user i in subframe 109, respectively, are expressed herein as $n_i$ and $m_i$. The values $n_i$ and $m_i$ may be different for the down-link path and the up-link path, furthermore, these values may change from H-FDD frame to frame. The portions 118 and 120 may have different shapes, consistent with the WiMAX specification (i.e., the portions 118 and 120 need not be rectangular).

The frame partition 106 separates the Group 1 subframes (107a and 109b) from the Group 2 subframes (107b and 109a) and is determined from the frame portion ratio of $$\frac{x}{1-x},$$

where x=0 or 1 reflects a zero partition H-FDD frame and where x is typically between 0 and 1.

In order to optimize the configuration for H-FDD operation, three sets of control variables are determined by the present system: (1) the integer number of slots $n_i$ and $m_i$ assigned to a user i, where i is an integer from 1 to I (the total number of users or remote stations); (2) the binary group indicator for user i ($a_i$=1 meaning that the user is in Group 1 and $a_i$=0 meaning that the user is in Group 2); and (3) the frame partition, x. As shown below, these values are derived herein from given parameters such as the respective down-link data rate for user i per slot, i.e., $R_i$, and the respective up-link data rate for user i per slot, $Q_i$, where $R_i$ is a function of the down-link carrier-to-interference-plus-noise ratio (CINR) measured by the remote station and reported to the base station, and $Q_i$ is a function of the up-link CINR measured by the base station.

In WiMAX and other cellular systems, for example, each remote station periodically provides to the base station with which it is communicating at any given time information regarding the CINR for the remote station within each group. This enables the base station to calculate the data rate per slot for each remote station and each group.

To determine the frame partitioning ratio $$\frac{x}{1-x},$$

it is assumed that $0 \leq x \leq 1$, and it is desired to be able to set x dynamically for each frame. By setting x over this range, the loading between user groups can be set to any value, such as 50/50, 90/10, 10/90, etc. In fact, it is noted that for techniques described herein, by setting x=1, the techniques may be applied to F-FDD systems. For some examples described herein, each user is assumed to have the same $R_i$ or $Q_i$ over an H-FDD frame; this is termed a uniform channel condition. However, in the case of multiple zones (e.g., PUSC reuse 1, PUSC reuse 3, and AMC), each zone within a portion of the subframe may have different values of $R_i$ and $Q_i$ because each zone will have its own CINR, meaning that the frame partition, x, can be applied on a per zone basis. Although in the described examples, each frame contains a single frame partition between subframes, where the down-link subframe portions (107) have the same frame partition (and thus partition ratio) as the up-link subframe portions (109).

To optimize the configuration for H-FDD, the system may take into account differing levels of quality of service (QoS) required by and/or provided to different remote stations (i.e., different users). The data rate for a remote station may for example depend upon the nature of the service the corresponding user has subscribed to, with some users being pre-assigned higher data rates or bandwidth priorities over other users. The base station, for example, may allocate slots to the remote stations by determining a weighted remote-station data rate for each remote station (also termed a respective weighted data rate). This data rate may be obtained by summing the data rates for the remote station in each of the subframes or frequency reuse zones to develop a composite data rate for each remote station and then to apply a weighting to the composite data rate of each remote station reflective of the desired QoS for that remote station. A minimum of the respective weighted data rates of the plurality of remote stations will vary with the respective slot allocations provided for the plurality of remote stations. Then, the overall slot allocation may be determined by maximizing the minimum of the weighted per-user data rates across all users and groups or frequency reuse zones. In this way, the weighting for down-link and up-link transmissions are taken into account for slot-allocation.

In symbolic terms, the base stations (e.g., 12, 14, 16) may allocate slots in an H-FDD system using slot-allocation approach that seeks to maximize the minimum of the respective weighted down-link data rate and the respective weighted up-link data rate quantities as follows:

$$\min_i \left[ \min_{DL,UL} \left\{ \frac{n_i R_i}{w_i}, \frac{m_i Q_i}{v_i} \right\} \right] \qquad \text{(Expression 1)}$$

subject to the following constraints:

$$\sum_{i=1}^{I} n_i = N \qquad \text{(Constraint 1)}$$

-continued $$\sum_{i=1}^{I} m_i = M \quad \text{(Constraint 2)}$$

$$\sum_{i=1}^{I} a_i n_i = xN \quad \text{(Constraint 3)}$$

$$\sum_{i=1}^{I} a_i m_i = (1-x)M \quad \text{(Constraint 4)}$$

$n_i \geqq 0$, integer for every $i$ (Constraint 5)

$m_i \geqq 0$, integer for every $i$ (Constraint 6)

$a_i = 0$ or 1, for every $i$ (Constraint 7)

$0 \leqq x \leqq 1$ (Constraint 8)

$wi(\geqq 0)$:DL weight for user $i$ (Constraint 9)

$vi(\geqq 0)$:UL weight for user $i$ (Constraint 10)

Constraint 1 requires that the total of the numbers of slots allocated to all I users or remote stations for down-link communications equals the total number of slots, N, in all down-link subframes (e.g., subframe portions 107 across subframes 104a and 104b). Correspondingly, Constraint 2 requires that the total of the numbers of slots allocated to all I users or remote stations for up-link communications equals the total number of slots, M, in all up-link subframes (e.g., subframe portions 109 across subframes 104a and 104b). In other words, all available slots are to be allocated to one of the I users for each frame. While N and M may be identical for each frame, they may be different depending on slot structures.

Constraint 3 pertains to the down-link subframe portions 107, where x is a first subframe length (e.g., subframe 104a) and 1−x is a second subframe length (e.g., subframe 104b) and $a_i$ is the binary user group identifier for the Group 1, and 1−$a_i$ is the user group identifier Group 2. Constraint 7 shows that $a_i$ is 1 for user i if that user has been assigned to the Group 1, and 0 for user i if that user has been assigned to Group 2. Constraint 4 pertains to the up-link subframe portions 109, in similar manner to that of Constraint 3 for the down-link subframe portions 107. Constraint 8 defines the relationship of x.

Constraints 5 and 6 require the numbers of slots allocated to each user i in the down-link portion (Constraint 5) and the up-link portion (Constraint 6) to be non-negative numbers.

The denominator of the quantity defined by Expression 1 includes a down-link communication numerical weight, $w_i$, assigned to each user or remote station i, which may correlate with, for example, the priority or price of communications of user i for down-link communications. For example, some users may have premium services that allow them to have higher data rates and/or higher priority over other users. A given user i for whom $w_i=0$ will have a weighted data rate of $$\frac{n_i R_i}{w_i} = \infty.$$

Consequently, the weighted data rate of that user cannot be a minimum of the weighted data rates among all users and thus will not bear on the maximization of that minimum.

The denominator of Expression 1 also includes an up-link communication numerical weight, $v_i$, assigned to each user or remote station i, which may correlate with, for example, the priority or price of communications of user i for up-link communications. Thus, in a H-FDD system, a user i may have a different priority, or weighting factor, for down-link and up-link communications.

Three types of users may be considered, by way of example. One, some users may be satisfied if all of their data is communicated at whatever minimum data rate is determined for the overall communication system 10. For these users, their corresponding communication weights may be set to zero ($w_i=0$, $v_i=0$). As explained above, the weighted data rate of these users will have no bearing on the maximization of the minimum weighted per-user data rate. Two, other users may require a particular minimum data rate because of QoS or other requirements. These users will have a non-zero $w_i$ and $R_{min,i}$ and a non-zero $v_i$ and $Q_{min,i}$, where the required minimum data rate $R_{min,i}$ and $Q_{min,i}$ satisfy $n_i R_i > R_{min,i}$ and $m_i Q_i > Q_{min,i}$, respectively for down-link and up-link. Three, still other users may be satisfied if all of their data is communicated on a when-possible or "best efforts" basis. For these users $R_{min,i}=0$ and $Q_{min,i}=0$.

It should be noted that inasmuch as each remote station has weighted data rates as described above, there will be a "minimum" weighted data rate associated with each group of remote stations for down-link communications and each group of remote stations for up-link communications. These minimums are what are maximized. One or more remote stations in the group may have the minimum weighted data rate.

In Expression 1, $n_i$ and $m_i$ (the respective down-link slot allocation to each user i and the respective up-link slot allocation to each user i during a frame, respectively) are control variables. Values for $n_i$ and $m_i$ may be determined in order to maximize the minimum of the weighted data rates for the remote stations, in this example the weighted data rates for down-link and up-link communications. In other words, the slots of a group are allocated among the plurality of remote stations communicating with a base station at a given time in such a way that the weighted data rate of whichever remote station has the lowest weighted data rate among all of the remote stations (i.e., the "minimum weighted data rate") is maximized. Thus, this solution advantageously takes account of the differing quality-of-service (QoS) requirements of all I users. These requirements may be satisfied by "best-efforts" service, where the base station provides communication to the user or remote station when it is possible to do so in light of other higher-priority communication traffic. Or, the requirements may be satisfied by having a minimum data rate requirement based on the particular type of communication being handled for that remote station. For example, video data may require a relatively high minimum data rate for acceptable quality, whereas acceptable internet browsing and other less data-intensive communication may be provided with a "best efforts" data rate.

It is challenging to find an optimal solution to Expression 1, because the partitioning problem is hard to solve in polynomial time, where for example with I users in 2 groups the system would have to produce $2^I$ cases, meaning the solutions increase exponentially with each user. Therefore, another solution is a suboptimal approach in which the solution determination is divided into two sequential sub-problems.

First, a slot allocation problem is solved for $n_i$ and $m_i$ for each user i, and without solving for or using constraints on x and $a_i$. For this allocation an integer programming problem solution can be determined. Second, user grouping and frame partitioning problems are solved, in which x and $a_i$ are solved based on $n_i$ and $m_i$. The problem is still challenging due to the single x for both subframes and because each user group should not overlap across this boundary. Therefore, to perform the user grouping and frame partitioning problem, instead of determining a single x in the first instances, two separate ratios are determined, a down-link frame partition, $x_D (0 \leq x_D \leq 1)$, and an up-link frame partition, $x_U (0 \leq x_U \leq 1)$, and from these x is determined.

Figure 4:
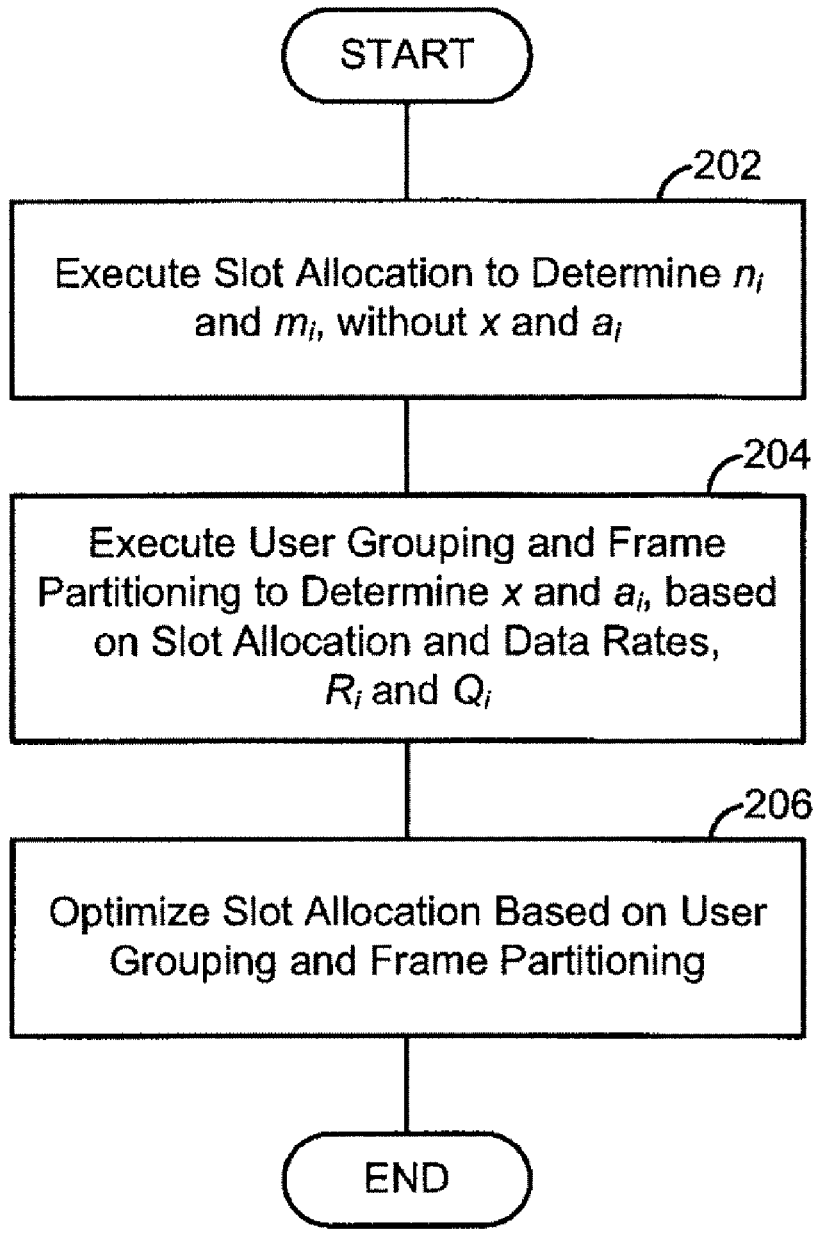
FIG. 4 depicts a process for slot allocation, user grouping, frame partitioning, and slot allocation re-optimization in accordance with an example.

A heuristic algorithm solution is now described in reference to FIG. 4, which shows an example process 200 for establishing duplex communications between a base station a plurality of remote stations. Block 202 may solve the developed linear programming problem to determine $n_i$ and $m_i$, without first determining x or $a_i$. For example, the system may allocate slots to users as if no partitioning exists, as would be the case in an F-FDD scheme, and as if no user group assignments existed, as would be the case in TDD. For example, Expression 1 is solved without Constraints 3, 4, 7, and 8.

Thus, a linear programming problem is developed by performing a sub-optimal or initial slot allocation in an H-FDD system. Such linear programming techniques (e.g., conventional techniques such as the Simplex method) can be used to determine how many slots in each subframe should be allocated to each user i (i.e., to determine optimal values for $n_i$ and $m_i$ for all users i). It is to be understood that techniques other than linear programming may be used to determine how many slots in each subframe to allocate to each user.

An example communication system in which only two users or remote stations communicate with a single base station using a subframe having only a single frequency reuse zone (e.g., a frequency reuse 1 zone or 3 zone or an AMC) will be described for explanatory purposes. In this simplified case, for the first, down-link expression in Expression 1, the linear programming problem reduces to maximizing the minimum of the respective weighted down-link data rates:

$$R = \min_{i=1,\ldots,I} \frac{n_i R_i}{w_i} \quad \text{(Expression 2)}$$

subject to:

$n_1 * R_1 \geq w_1 * R$ (Constraint 11)

$n_2 * R_2 \geq w_2 * R$ (Constraint 12)

$n_1 * R_1 \geq R_{min1}$ (Constraint 13)

$n_2 * R_2 \geq R_{min2}$ (Constraint 14)

$n_1 + n_2 = N$ (Constraint 15)

$n_1 \geq 0$ (Constraint 16)

$n_2 \geq 0$ (Constraint 17)

Figure 5:
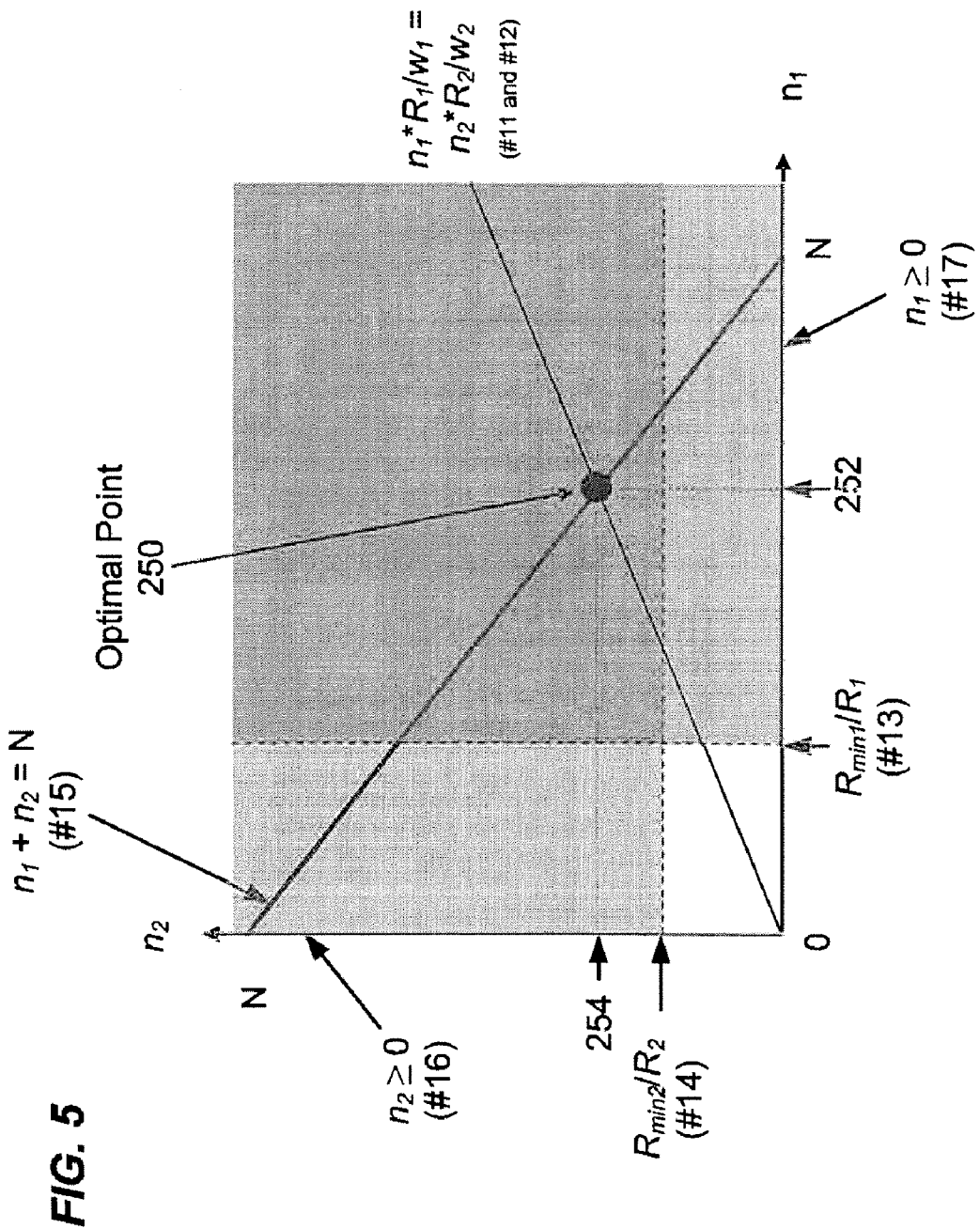
FIG. 5 depicts a graphical representation of example linear programming constraints which may be used to determine a respective down-link slot allocation.

This simple linear programming problem and the corresponding solution are illustrated graphically in FIG. 5. In this example solution, the various constraints are shown as illustrated as optimal point 250, which has coordinates corresponding to the simultaneously determined values for a respective down-link slot allocation value 252 for remote station 1 and a respective down-link slot allocation value 254 for remote station 2.

Constraints 16 and 17 restrict the slot allocation of each user to non-negative numbers, such that the solution must be in the upper-right quadrant, as shown. Constraint 15 requires that all slots in the subframe be used (i.e., every slot must be allocated to one of the two remote stations). Constraints 11 and 12 implement the "best efforts" requirement of each of the two remote stations, with an optimal solution produced when equality holds for each of those two constraints (i.e., when $n_1 * R_1 = w_1 * R$ and $n_2 * R_2 = w_2 * R$) such that the two constraints can be combined to produce a linear equation in $n_1$ and $n_2$, namely:

$$\frac{n_1 R_1}{w_1} = \frac{n_2 R_2}{w_2} \quad \text{(Expression 3)}$$

This line is also shown graphically in FIG. 5 and the point of intersection is labeled.

Constraints 13 and 14 implement the minimum data rate requirements of the two users.

This very simplified example involving a subframe with only a single zone and no minimum data rate requirement for either of the two users (i.e., $R_{min1} = R_{min2} = 0$) yields a very simple closed-form solution for the optimal slot allocation among I users for the down-link:

$$n_j = \frac{\frac{w_j}{R_j}}{\sum_{i=1}^{I} \frac{w_i}{R_i}} N_1, \quad j = 1, \ldots, I \quad \text{(Expression 4)}$$

The foregoing description provides one embodiment of a method of calculating slot allocations in a duplex communication system, such as a WiMAX H-FDD system. For simplicity of description, the numbers of slots were not constrained to be integers. However, as will be apparent to those skilled in the art, the numbers of slots $n_i$ should have integer values for all $i=1, \ldots, I$ (i.e., for all users). Therefore, after a slot allocation solution is found as described herein, any suitable post-processing algorithm may be applied to obtain an integer slot allocation solution close to the calculated optimal solution. For example, conventional integer programming, round-off, or other optimization techniques may be used.

In any event, a similar determination to that for Expression 2 is made of the up-link determination, using expressions and constraints similar to that of Constraints 11-17 above but applied to up-link communications:

$$Q = \min_{i=1,\ldots,I} \frac{m_i Q_i}{v_i} \quad \text{(Expression 5)}$$

Figure 6:
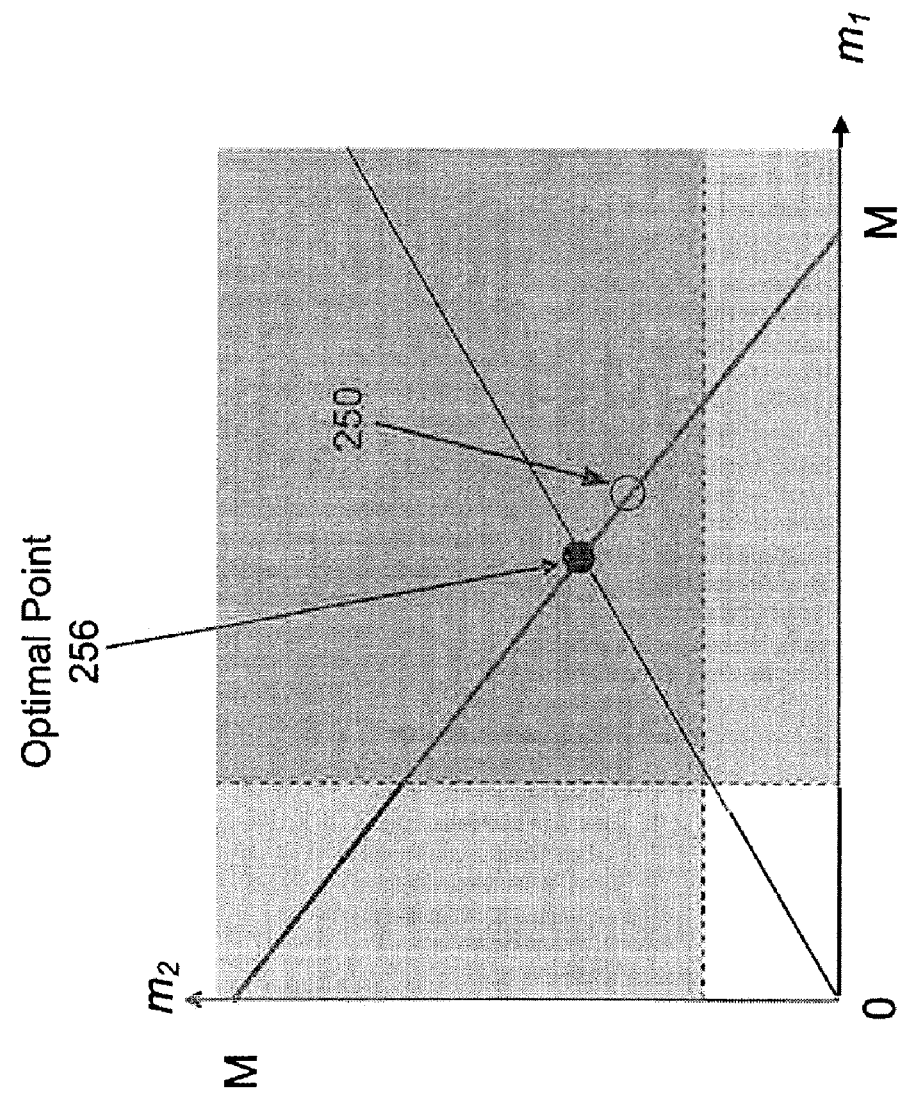
FIG. 6 depicts a graphical representation of example linear programming constraints which may be used to determine a respective up-link slot allocation.

A corresponding solution to the linear programming problem for the up-link communication may be performed in the same way as for the down-link solution; and thus we only provide an example of the final solution in FIG. 6. Optimal point 256 is shown as determined for the respective up-link slot allocations, $m_1$ and $m_2$, for remote stations 1 and 2, respectively.

To solve for $n_i$ and $m_i$, the maximum of the minimums of the down-link and up-link communications are taken for each user i according to Equations 2 and 5. For example, the maximum of the minimums formed from FIG. 5 and FIG. 6.

With the initial respective down-link and up-link slot allocations ($n_i$ and $m_i$, respectively) determined for each user i, the system (e.g., a block 204 of FIG. 4) may then determine user group assignments and frame partitioning by using a linear programming problem to minimize the difference between the down-link frame partition, $x_D$, and the up-link frame partition, $x_U$:

$$|x_D - x_U| \quad \text{(Expression 6)}$$

subject to:

$$\sum_{i=1}^{I} a_i n_i = x_D N \quad \text{(Constraint 18)}$$

$$\sum_{i=1}^{I} a_i m_i = (1 - x_U) M \quad \text{(Constraint 19)}$$

$$\sum_{i=1}^{I} (1 - a_i) n_i = (1 - x_D) N \quad \text{(Constraint 20)}$$

$$\sum_{i=1}^{I} (1 - a_i) m_i = x_U M \quad \text{(Constraint 21)}$$

$$a_i = 0 \text{ or } 1 \text{ for every } i \quad \text{(Constraint 22)}$$

$$0 \leq x_D \leq 1 \quad \text{(Constraint 23)}$$

$$0 \leq x_U \leq 1 \quad \text{(Constraint 24)}$$

Expression 6 may be described as a mixed integer programming problem, with an auxiliary variable Z, where the problem is expressed as one to minimize:

$$Z \quad \text{(Expression 7)}$$

subject to:

$$Z \leq x_D - x_U \quad \text{(Constraint 22)}$$

$$Z \leq x_U - x_D \quad \text{(Constraint 23)}$$

$$Z \leq 0 \quad \text{(Constraint 24)}$$

$$\sum_{i=1}^{I} a_i n_i = x_D N \quad \text{(Constraint 25)}$$

$$\sum_{i=1}^{I} a_i m_i = (1 - x_U) M \quad \text{(Constraint 26)}$$

$$\sum_{i=1}^{I} (1 - a_i) n_i = (1 - x_D) N \quad \text{(Constraint 27)}$$

$$\sum_{i=1}^{I} (1 - a_i) m_i = x_U M \quad \text{(Constraint 28)}$$

$$a_i = 0 \text{ or } 1 \text{ for every } i \quad \text{(Constraint 29)}$$

$$0 \leq x_D \leq 1 \quad \text{(Constraint 30)}$$

$$0 \leq x_U \leq 1 \quad \text{(Constraint 31)}$$

From this solution the optimal value for the down-link subframe partition, $x_D$, and up-link subframe partition, $x_U$ are obtained, for example, using mixed integer programming techniques. The values $x_D$ and $x_U$ are then used to determine the overall subframe partition, x, for the entire frame by the following expression:

$$x = \frac{x_D + x_U}{2} \quad \text{(Expression 8)}$$

With x and $a_i$ determined, the slot allocation problem of Expression 1 may be re-solved (e.g., through integer programming at block 206 of FIG. 4) for each group to obtain new sets of $n_i'$ and $m_i'$. Specifically for remote stations assigned to Group 1, maximization the following expression is used:

$$\min_{i \in Group1} \left[ \min_{DL, UL} \left\{ \frac{n_i' R_i}{w_i}, \frac{m_i' Q_i}{v_i} \right\} \right] \quad \text{(Expression 9)}$$

subject to:

$$\sum_{i \in Group1} n_i' = xN$$

$$\sum_{i \in Group1} m_i' = (1 - x) M$$

$n_i' \geq 0$
$m_i' \geq 0$ integer for every i in Group I
For remote stations assigned to Group 2, maximization of the following expression is used:

$$\min_{i \in Group2} \left[ \min_{DL, UL} \left\{ \frac{n_i' R_i}{w_i}, \frac{m_i' Q_i}{v_i} \right\} \right] \quad \text{(Expression 10)}$$

subject to:

$$\sum_{i \in Group2} n_i' = (1 - x) N$$

$$\sum_{i \in Group2} m_i' = xM$$

ni' $\geq 0$
mi' $\geq 0$, integer for every i in Group 2

In other examples, the system may just take the $n_i$ and $m_i$ results from the suboptimal approach in (e.g., of block 202), as the final slot allocation values for each user i. While in other examples, an iterative approach using the calculated x and $a_i$ values may be performed (e.g., by block 206) to further refine or validate those values. This re-allocation of the respective down-link and up-link slot allocation may occur dynamically, each frame, for example.

While the examples herein are described with reference to an OFDMA H-FDD system, the algorithms may be applied to an F-FDD system with a preset x=1, such that there is no user grouping nor frame partitioning.

FIG. 7 depicts a block diagram of an example base station 300 for a cellular or other wireless communication system employing an embodiment of a slot allocation, user grouping, and frame partitioning method such as described above. The illustrated base station 300 receives information from each remote station i that is communicating with the base station 300 at a given time regarding the carrier-to-interference-plus-noise ratio (CINR) encountered by the remote station i. The CINR information, collectively represented by block 302 in FIG. 7, is provided to a data rate assigner 304. The assignor 304 assigns to each remote station a down-link data rate $R_i$ for communication of that remote station in each down-link subframe. That down-link data rate $R_i$ may be calculated as a pre-determined function of the current $CINR_i$ encountered by the remote station i. For example, the data rate $R_i$ may be calculated according to the formula $R_i=\log(1+CINR_{i,D}/$Gamma$)$, where Gamma is a constant (e.g., Gamma=1) and ($CINR_{i,D}$ corresponds to down-link frames). Similarly, the up-link data rate $Q_i$ may be calculated according to the formula $Q_i=\log(+1(CINR_{i,U}/$frame$)$, where ($CINR_{i,U}$ corresponds to the up-link frames). The data rates are used by a slot allocation provider 306 to determine a slot allocation for each remote station i, comprising a number $n_i$ of slots of each frame to allocate to remote station i for down-link communication of remote station i, and a number $m_i$ of slots for each frame for up-link communication. Upon finalization, the base station 300 provides the respective data rates produced by the data rate assigner 304 and the respective slot allocations produced by the slot allocation provider 306 to the remote stations to permit subsequent communication between the remote stations and the base station 300. The base station 300 may also include a weighting module 308 configured to assign a weight to each remote station based on, for example, a quality of service requirement of the remote station or other user information regarding each user or remote station. A weighted data rate of each remote station may then be based on the weight assigned to that remote station.

Before the slot allocation provider finalizes $n_i$ and $m_i$, the initial values are provided to a user grouper and frame partitioner 310 which determines the user grouping, $a_i$, and frame partition, x, for the H-FDD system. Optionally, such values may then be returned to the slot allocation provider 306 for further optimization of the slot allocations; although discussed above, this need not be the case. After the final slot allocations have been determined, frame data communications may be achieved between the base station and the plurality of remote stations in accordance with the down-link and up-link slot allocations.

Each of the blocks of the base station 300 shown in FIG. 7 may be implemented as machine-readable instructions executed by a processor. Such instructions may be stored in a memory coupled to the processor or in any other desired computer-readable medium.

For illustrative purposes, the techniques described above were in the context of a WiMAX system, which employs orthogonal frequency-division multiple-access to modulate the communicated data. However, similar techniques also may be applied in systems employing other modulation techniques.

Those skilled in the art will also appreciate that slot-allocation, user grouping and frame partition methods and apparatus such as described above may be developed entirely or partially within a base station or in any other suitable centralized or distributed location.

Although examples in the context of WiMAX (i.e., 802.16a/d/e) were discussed above, these slot allocation techniques may be utilized in other contexts as well such as digital audio broadcast (DAB) systems and digital video broadcast (DVB) systems. More generally, techniques such as described above can be utilized in any OFDM synchronous communication system.

The various blocks, operations, and techniques described above may be implemented in hardware, firmware, software, or any combination of hardware, firmware, and/or software. When implemented in software, the software may be stored in any computer readable memory such as on a magnetic disk, an optical disk, or other storage medium, in a RAM or ROM or flash memory of a computer, processor, hard disk drive, optical disk drive, tape drive, etc. Likewise, the software may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software may be delivered to a user or a system via a communication channel such as a telephone line, a DSL line, a cable television line, a wireless communication channel, the Internet, etc. (which are viewed as being the same as or interchangeable with providing such software via a transportable storage medium). When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, it will be apparent to those of ordinary skill in the art that changes, additions, or deletions in addition to those explicitly described above may be made to the disclosed embodiments without departing from the spirit and scope of the invention.

What is claimed is:

1. A method for establishing duplex communication between a base station and a plurality of remote stations, wherein the duplex communication is partitioned into a series of frames, each frame including (i) a total integer number of slots, N, for down-link communication and (ii) a total integer number of slots, M, for up-link communication, the method comprising:

assigning, to each remote station, a respective down-link data rate and a respective up-link data rate for communication between that remote station and the base station;

providing for each remote station, using the base station, a respective down-link slot allocation for communication between that remote station and the base station, wherein the down-link slot allocation comprises a number of slots of the total slots N; and providing for each remote station, using the base station, a respective up-link slot allocation for communication between that remote station and the at least one base station, wherein the up-link slot allocation comprises a number of slots of the total slots M, wherein each remote station has a respective weighted down-link data rate associated with the respective down-link data rate assigned to that remote station, and each remote station has a respective weighted up-link data rate associated with the respective up-link data rate assigned to that remote station, whereby a minimum of the respective weighted down-link data rates varies with the respective down-link slot allocation for each remote station, and a minimum of the respective weighted up-link data rates varies with the respective up-link slot allocation for each remote station, and wherein the base station determines the respective down-link slot allocations of the plurality of remote stations and the respective up-link slot allocations of the plurality of remote stations so as to maximize the minimum of the weighted down-link data rates and of the weighted up-link data rates of the plurality of remote stations.

2. The method of claim 1, wherein the duplex communication is half-duplex communication wherein each frame comprises a first subframe in which (i) a first user group of remote stations receives down-link data and (ii) a second user group of remote stations communicates up-link data, and a second subframe in which (i) the first user group of remote stations transmit up-link data and (ii) the second user group of remote stations receives down-link data, wherein each of the remote stations is assigned to either the first user group or the second user group in each frame, and wherein the first subframe is separated from the second subframe by a frame partition.

3. The method of claim 2, wherein the weighted down-link data rate of each remote station i is given by $$\frac{n_i R_i}{w_i},$$

where $n_i$ is the number of slots assigned to the remote station i for down-link communication in each frame, $R_i$ is the down-link data rate per slot assigned to the remote station i for down-link communication in each frame, and $w_i$ is a down-link weighting factor assigned to the remote station i.

4. The method of claim 2, wherein the weighted up-link data rate of each remote station i is given by $$\frac{m_i Q_i}{v_i},$$

where $m_i$ is the number of slots assigned to the remote station i for up-link communication in each frame, $Q_i$ is the up-link data rate per slot assigned to the remote station i for up-link communication in each frame, and $v_i$ is a up-link weighting factor assigned to the remote station i.

5. The method of claim 2, further comprising:
after providing the respective down-link slot allocation and the respective up-link slot allocation for each remote station, assigning, using the base station, each remote station to one of the first user group or the second user group.

6. The method of claim 5, further comprising:
determining, using the base station, a down-link frame partition for separating the first subframe and the second subframe for down-link communications, where the down-link frame partition depends on the respective down-link slot allocations and the respective up-link slot allocations to each remote station and depends on the assignment of each remote station to either the first user group or the second user group;

determining, using the base station, an up-link frame partition for separating the first subframe and the second subframe for up-link communications, where the up-link frame partition depends on the respective down-link slot allocations and the respective up-link slot allocations to each remote station and depends on the assignment of each remote station to either the first user group or the second user group; and determining, using the base station, the frame partition from the down-link frame partition and the up-link frame partition.

7. The method of claim 6, wherein the base station determines the frame partition, x, as the geometric mean of the down-link frame partition, $x_D$, and the up-link frame partition, $x_U$, given by $$x = \frac{x_D + x_U}{2}.$$

8. The method of claim 6, further comprising re-allocating, using the base station, the down-link slot allocation and the up-link slot allocation to each remote station in response to the determination of the frame partition and after the assignment of each remote station to one of the first user group or the second user group.

9. The method of claim 6, further comprising minimizing the difference between the down-link frame partition and the up-link frame partition using mixed integer programming to determine the frame partition.

10. The method of claim 5, further comprising for a subsequent frame, reassigning, using the base station, at least one of the remote stations from the first user group to the second user group or vice versa.

11. The method of claim 1, wherein every one of the N slots for down-link communication and every one of the M slots for up-link communication are allocated to one of the plurality of remote stations in each frame.

12. The method of claim 1, wherein the duplex communication is performed by a WiMAX system operating in a half-frequency division duplex mode.

13. The method of claim 1, further comprising communicating data between the base station and at least one of the plurality of remote stations in accordance with the respective down-link and up-link slot allocations of that at least one of the plurality of remote stations.

14. A method for establishing duplex communication in a slot-based communication system, wherein communication is among a base station and a plurality of remote stations over a series of frames, each frame including (i) a total integer number of slots, N, for down-link communications and (ii) a total integer number of slots, M, for up-link communications, the method comprising:

identifying for each remote station of the plurality of remote stations, using the base station, a respective down-link data rate and a respective up-link data rate for communication between the remote station and the base station, wherein each remote station has (i) a respective down-link weighting factor indicative of a respective desired down-link quality of service level of the remote station and (ii) a respective up-link weighting factor indicative of a respective desired up-link quality of service level of the remote station, wherein each remote station has a respective weighted down-link data rate associated with (i) the respective down-link data rate and (ii) the respective down-link weighting factor, and wherein each remote station has a respective weighted up-link data rate associated with (i) the respective up-link data rate and (ii) the respective up-link weighting factor;

assigning to each of the plurality of remote stations, using the base station, (i) a respective down-link slot allocation for receiving down-link data from the base station during the frame and (ii) a respective up-link slot allocation for transmitting up-link data to the base station during the frame, so as to maximize the minimum of the respective weighted down-link data rates and of the respective weighted up-link data rates of the plurality of remote stations;

assigning, using the base station, each of the plurality of remote stations to one of a first user group and a second user group based on (i) the assigned respective down-link slot allocation and (ii) the assigned respective up-link slot allocation for each of the remote stations, wherein remote stations in the first user group are to receive down-link data in a first subframe and communicate up-link data in a second subframe, and wherein remote stations in the second user group are to communicate up-link data in the first subframe and receive down-link data in the second subframe; and determining, using the base station, a frame partition separating the first subframe from the second subframe based on the assigned respective down-link slot allocation and the assigned respective up-link slot allocation for each of the remote stations.

15. The method of claim 14, wherein the weighted down-link data rate of each remote station i is given by $$\frac{n_i R_i}{w_i},$$

where $n_i$ is the number of slots assigned to the remote station i for down-link communications in each frame, $R_i$ is the down-link data rate per slot assigned to the remote station i for down-link communications in each frame, and $w_i$ is the respective down-link weighting factor assigned to the remote station i.

16. The method of claim 14, wherein the weighted up-link data rate of each remote station i is given by $$\frac{m_i Q_i}{v_i},$$

where $m_i$ is the number of slots assigned to the remote station i for up-link communications in each frame, $Q_i$ is the up-link data rate per slot assigned to the remote station i for up-link communications in each frame, and $v_i$ is the respective up-link weighting factor assigned to the remote station i.

17. The method of claim 14, wherein the respective down-link data rate and the respective up-link data rate are the same for each of the plurality of remote stations.

18. The method of claim 14, wherein the respective down-link data rate depends on the carrier-to-interference-and-noise-ratio for down-link data and is measured by the respective remote station and communicated from the respective remote station to the base station, and wherein the respective up-link data rate depends on the carrier-to-interference-and-noise-ratio for up-link data and is measured by the base station.

19. The method of claim 14, wherein all of the total number of slots, N, for down-link communications in a frame are assigned to remote stations by the base station, and wherein all of the total number of slots, M, for up-link communications in a frame are assigned to remote stations by the base station.

20. The method of claim 14, wherein the slot-based communication system is a WiMAX system wherein the WiMAX system communicates in a half-frequency division duplex mode.

21. The method of claim 14, further comprising communicating data between the base station and at least one of the plurality of remote stations in accordance with the respective down-link and up-link slot allocations of that remote station.

22. The method of claim 14, wherein determining the frame partition comprises:

determining, using the base station, a down-link frame partition for separating the first subframe and the second subframe for down-link communications;

determining, using the base station, an up-link frame partition for separating the first subframe and the second subframe for up-link communications; and determining, using the base station, the frame partition from the down-link frame partition and the up-link frame partition.

23. The method of claim 22, wherein the base station determines the frame partition, x, as an arithmetic mean of the down-link frame partition, $x_D$, and the up-link frame partition, $x_U$, given by $$x = \frac{x_D + x_U}{2}.$$

24. The method of claim 14, further comprising re-assigning, using the base station, the down-link slot allocation and the up-link slot allocation to each remote station in response to the determination of the frame partition and user groupings prior to the base station communicating slot allocation data to the plurality of remote stations.

\* \* \* \* \*